(12) United States Patent
Larson et al.

(10) Patent No.: US 7,406,265 B2
(45) Date of Patent: Jul. 29, 2008

(54) FIBER OPTIC COMMUNICATION SIGNAL LINK APPARATUS

(75) Inventors: Hugh W. Larson, Milford, MI (US); Paul J. Morand, Hartland, MI (US)

(73) Assignee: Michigan Scientific Corp., Milford, MI (US)

(*) Notice: Subject to any disclaimer, the term of this patent is extended or adjusted under 35 U.S.C. 154(b) by 526 days.

(21) Appl. No.: 10/975,752

(22) Filed: Oct. 28, 2004

(65) Prior Publication Data

US 2006/0093374 A1 May 4, 2006

(51) Int. Cl.
*H04B 10/12* (2006.01)
*H04B 10/00* (2006.01)
*H04B 10/04* (2006.01)
*H04B 10/06* (2006.01)

(52) U.S. Cl. .................. 398/158; 398/141; 398/192; 398/208

(58) Field of Classification Search ............... 398/140, 398/141, 149, 158, 195, 94, 160, 175, 192, 398/194, 197, 208–210
See application file for complete search history.

(56) References Cited

U.S. PATENT DOCUMENTS

| 4,996,531 | A | | 2/1991 | Kotter et al. |
| 5,307,006 | A | * | 4/1994 | Rankin et al. ............... 323/313 |
| 5,939,924 | A | * | 8/1999 | Visocchi et al. ............. 327/336 |
| 6,388,784 | B1 | | 5/2002 | Nakamura et al. |
| 6,603,865 | B1 | | 8/2003 | Yagi et al. |
| 6,671,465 | B1 | | 12/2003 | Cohen et al. |
| 6,963,036 | B1 | * | 11/2005 | Zicher ........................ 177/185 |
| 6,972,880 | B1 | * | 12/2005 | Kanesaka ................... 398/160 |
| 2003/0210914 | A1 | * | 11/2003 | Khayim et al. ............. 398/197 |

* cited by examiner

*Primary Examiner*—Dalzid Singh
(74) *Attorney, Agent, or Firm*—Young & Basile (57) ABSTRACT

A fiber optic communication signal link apparatus for performing fiber optic link communication including a transmitter apparatus and a receiver apparatus coupled by a fiber optic cable. The transmitter is capable of detecting and modulating data that includes at least one of position, light and audio data. An analog voltage signal representing the data is transmitted to the transmitter apparatus wherein the signal is detected, converted to a frequency signal and modulated through the fiber optic cable to the receiver apparatus. Subsequently, the frequency signal is detected, demodulated and converted back to a voltage analog signal in the receiver apparatus.

38 Claims, 10 Drawing Sheets

FIBER OPTIC COMMUNICATION SIGNAL LINK APPARATUS

FIELD OF THE INVENTION

The present invention relates to a transmitter/receiver data communication system and, more particularly, to a fiber optic signal link apparatus for transmission of electrical signals over fiber optic cables.

BACKGROUND

Fiber optic communication has been hailed as the superior method of transmitting video, audio, data and various analog signals. Optical fibers offer many well known advantages over twisted pair and coaxial cable, including immunity to electrical interference and superior bandwidth. For these reasons, fiber optic transmission systems have been increasingly integrated into a wide range of applications across many industries.

While fiber optic transmission has dramatically improved the stability and accuracy of conventional copper based transmission mediums, fiber optic technology has continued to use the same, traditional, analog based signaling techniques. A new generation of products employing pure digital signaling to transmit analog information brings fiber optic transmission to a new, improved level.

Fiber optic transmission systems are sold in both amplitude modulation and frequency modulation versions. In both systems, an optical transmitter receives an analog data signal and converts it to an optical signal.

In existing amplitude modulation systems, various distortions occur to the transmitted signal. For example, there is a degradation in the signal to noise ratio as the length of the fiber optic cable is increased. Also, there are non-linear differential gain and phase errors of video signals and poor dynamic range of audio signals, etc.

In existing frequency modulation systems, the need to transmit electrical signals over fiber optic cables from sources in high electromagnetic fields or anechoic chambers to monitoring equipment in low field areas exist. Additionally, there is the need to reduce electromagnetic interference of the transmitted signal without compromising signal integrity.

Therefore, it is apparent that a need exists for techniques to eliminate the various distortions in amplitude modulation fiber optic transmission systems. Furthermore, it is apparent that a need exists within frequency modulation systems to be able to transmit electrical signals over fiber optic cables from sources in high electromagnetic fields or anechoic chambers to monitoring equipment in low field areas. Furthermore, in frequency modulation systems there is a need to reduce electromagnetic interference of the transmitted signal without compromising signal integrity.

SUMMARY

The present invention is a fiber optic communication signal link apparatus for communication of data including displacement, light and audio information. The apparatus includes a fiber optic transmission or transmitter apparatus for scaling and frequency modulating an analog voltage input signal into a corresponding frequency for transmission. Furthermore, the apparatus includes a fiber optic receiver apparatus for demodulating the frequency signal sent by the transmission or transmitter apparatus, into an analog voltage signal.

The fiber optic transmission or transmitter apparatus includes an input filter for noise reduction and a differential amplifier, coupled to the filter, for amplifying the noise reduced analog voltage. Furthermore, voltage adjustment means are coupled to the amplifier for scaling the noise reduced, amplified voltage signal. Additionally, a voltage to frequency converter is coupled to the voltage adjustment means, for converting the noise reduced, amplified voltage signal into a frequency signal.

The fiber optic receiver apparatus includes a frequency comparator and a phase locked loop circuit is coupled to the frequency comparator. A frequency to voltage converter is coupled to the phase locked loop circuit, for converting the transmitted frequency signal into a voltage signal. A low pass filter is coupled to the frequency to voltage converter, for noise reduction of the converted voltage signal. Furthermore, voltage adjustment means are coupled to the low pass filter, for scaling the voltage signal.

In one aspect, measurement means for measuring displacement are coupled to the transmission or transmitter apparatus. The transmission or transmitter apparatus detects and modulates the measured displacement signal.

In another aspect, a light detector means for measuring light is coupled to the transmission or transmitter apparatus. The transmission or transmitter apparatus detects and modulates the measured light signal.

In another aspect, audio means for measuring sound are coupled to the transmission or transmitter apparatus. The transmission or transmitter apparatus detects and modulates the measured sound.

The present apparatus eliminates the various distortions present in amplitude modulation fiber optic transmission systems. The apparatus also satisfies the need in frequency modulation systems to be able to transmit electrical signals over fiber optic cables from sources in high electromagnetic fields or anechoic chambers to monitoring equipment in low field areas. The apparatus further satisfies the need in frequency modulation systems to reduce electromagnetic interference of the transmitted signal without compromising signal integrity.

BRIEF DESCRIPTION OF THE DRAWINGS

The description herein makes reference to the accompanying drawings wherein like reference numerals refer to like parts throughout the several views, and wherein.

DETAILED DESCRIPTION

Figure 2:
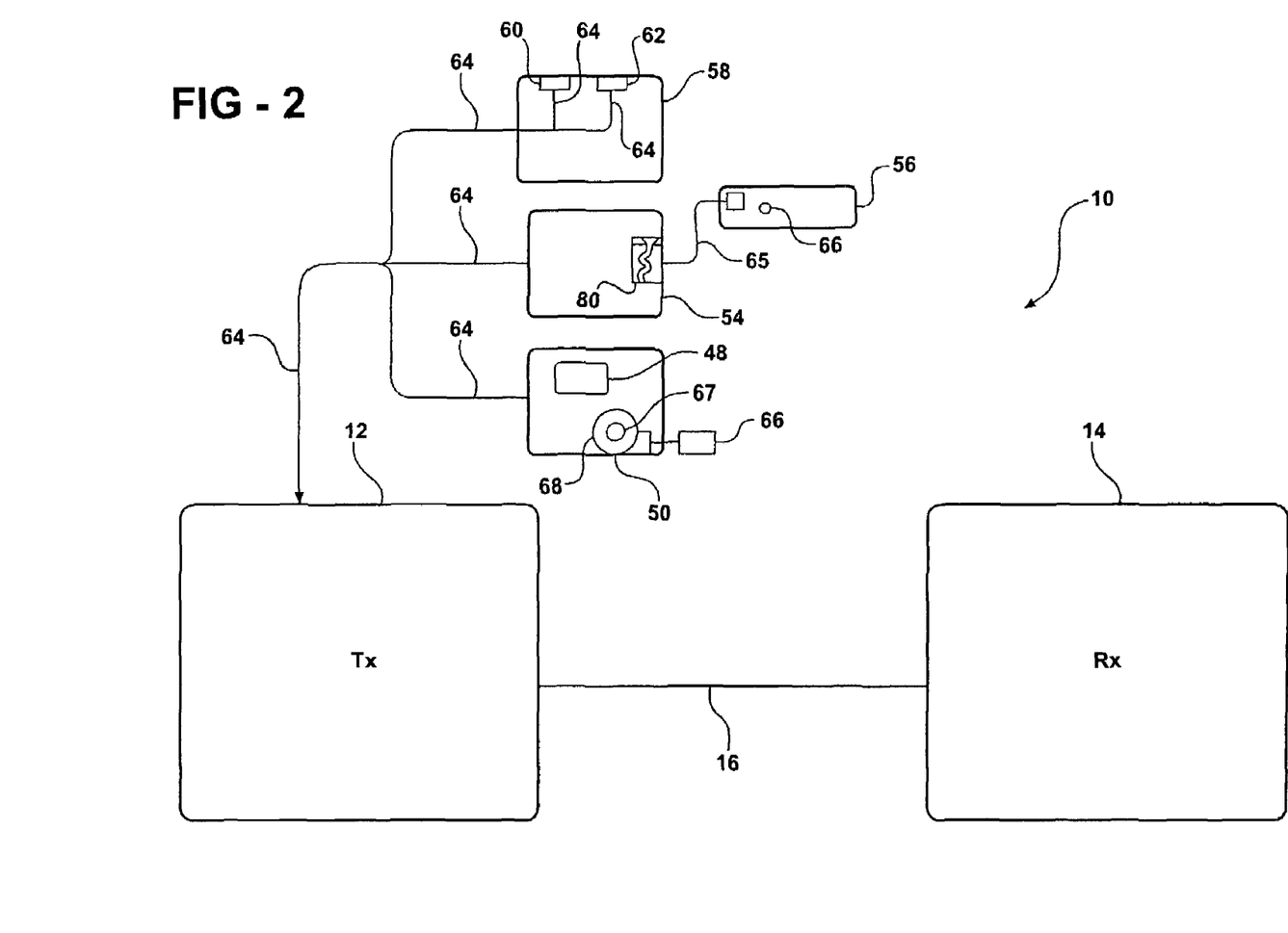
FIG. 2 is a block diagram of a fiber optic communication signal link apparatus of the present invention.
Figure 3:
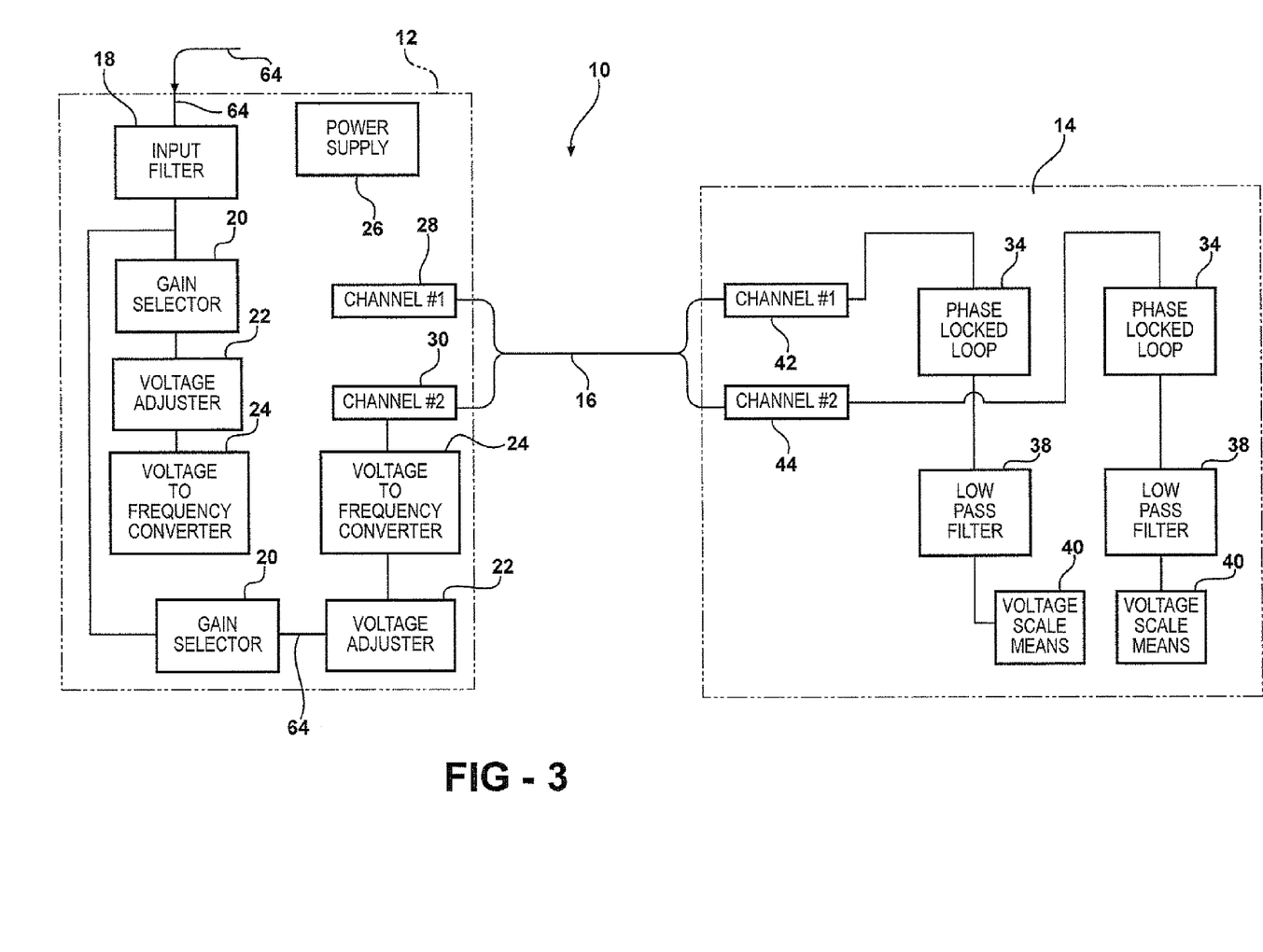
FIG. 3 is a more detailed block diagram of the fiber optic communication link apparatus of FIG. 2, including components of a transmission apparatus and a receiver apparatus.

In FIGS. 2 and 3, there is shown a fiber optic communication signal link apparatus 10 according to the present invention, for communication of data, including but not limited, to displacement, light and audio information.

The fiber optic communication signal link apparatus 10 includes a fiber optic transmission or transmitter apparatus 12 for scaling and frequency modulating any type of an analog voltage input signal into a corresponding frequency signal for transmission. The communication signal link apparatus 10 also includes a fiber optic receiver apparatus 14 for demodulating the frequency signal transmitted by the transmission or transmitter apparatus 12. The incoming frequency signal is demodulated into an analog voltage signal.

Figure 1:
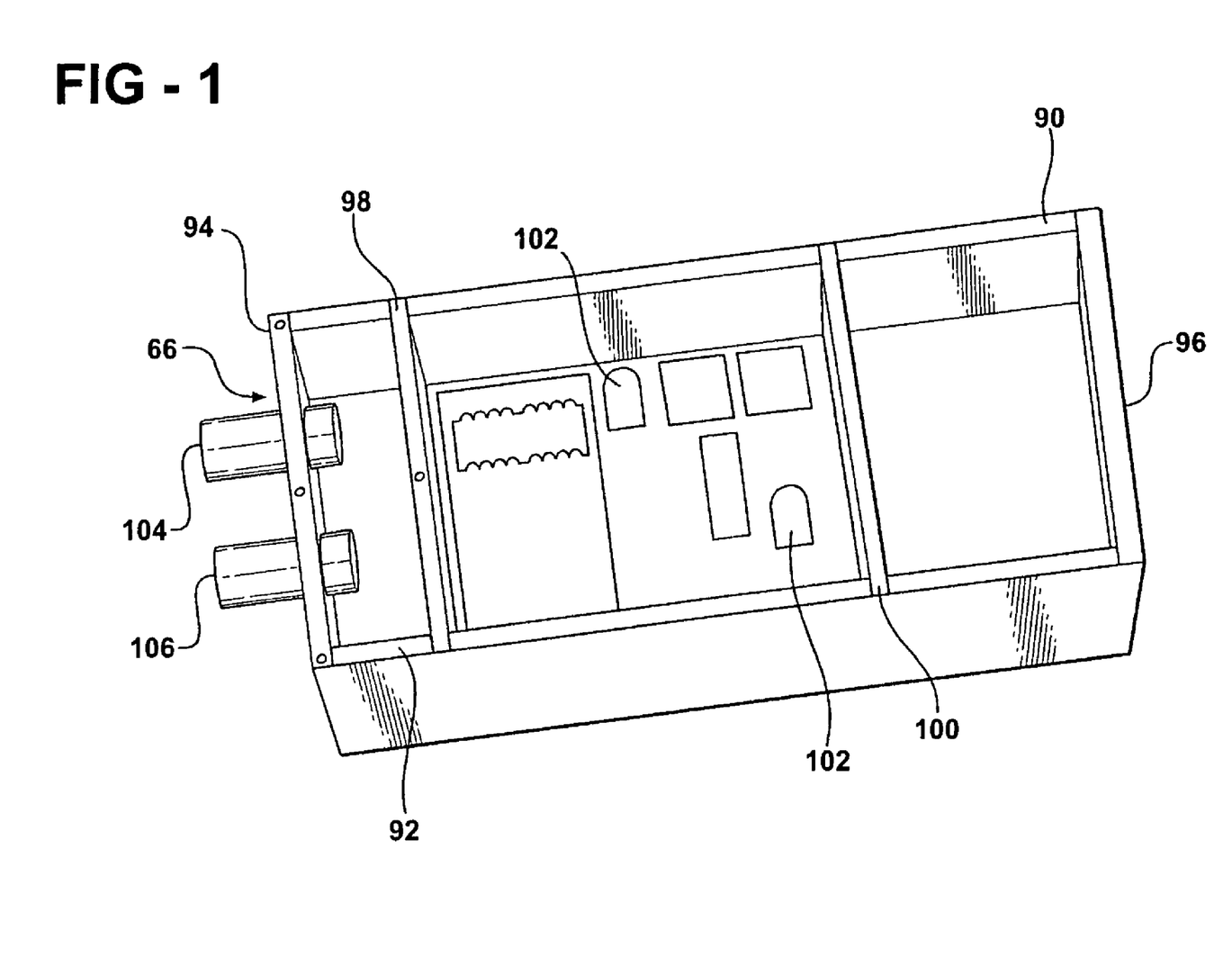
FIG. 1 is a perspective view of a fiber optic transmitter.

FIG. 1 shows an analog signal transmitter apparatus 86 with a cover removed. The transmitter 86 has a rectangular shaped housing including two longitudinally extending walls 90 and 92 coupled to two side walls 94 and 96. Two intermediate walls 98 and 100 form compartments for housing electrical components within the transmitter 86 such as capacitors 102, etc., on a printed circuit board. Two input leads 104 and 106 are coupled to the sidewall 94.

Figure 8:
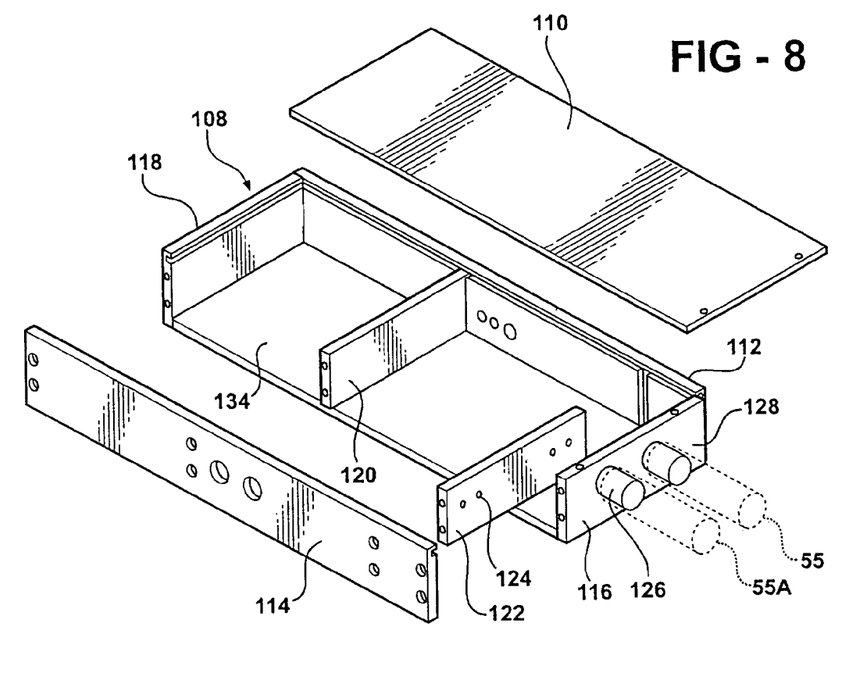
FIG. 8 is an exploded perspective view of a housing of a fiber optic transmitter of FIGS. 2 and 3.

FIG. 8 shows an improved analog signal transmission apparatus 12. A housing is shown, the housing 108 is rectangular shaped by example only and includes a cover 110 and, two longitudinally extending walls 112 and 114 coupled to two side walls 116 and 118. One intermediate wall 120 is coupled to the longitudinal walls 112 and 114 at opposite ends to form compartments for housing electrical components. A plate 122 with a plurality of apertures 124 is attached to the two longitudinal walls 112 and 114 near input leads 126 and 128. The plate 122 is formed of material that minimizes electromagnetic interference by blocking undesired RF signals from entering into the transmitter 12. The input leads 126 and 128 are high impedance leads formed of material that helps minimize electromagnetic interference by blocking undesired RF signals from entering into the transmitter 12.

Figure 4A:
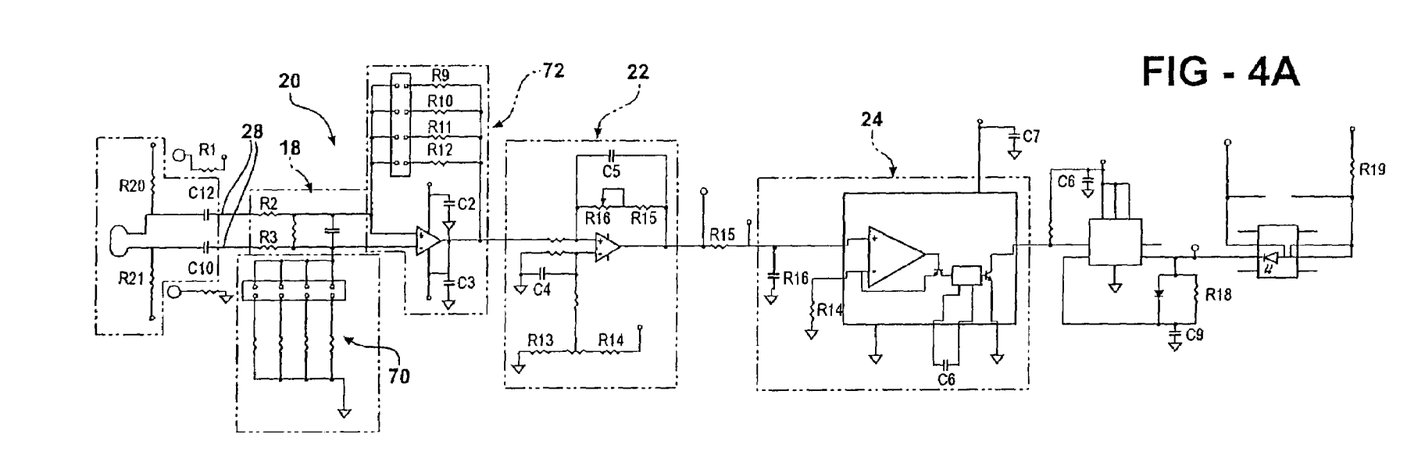
FIG. 4A is a circuit diagram of the transmission apparatus of FIG. 3.

As shown in FIG. 4A, the transmitter apparatus 12 includes an input filter circuit 18. The analog voltage input signal is transmitted by an electrical conductor 64 to the transmitter apparatus 12 where the voltage input signal is applied to the input filter circuit 18. The filter 18 minimizes the noise associated with the voltage signal in order to produce a clearer, more accurate voltage signal. An operator may provide effective attenuation or gain to the input signal level by using gain jumpers 70 and 72, which provide congruity for input voltages ranging from 80 mV to 480V. Once the voltage signal noise has been minimized, the filtered voltage signal is transmitted to a differential amplifier circuit 20 that is coupled to an output of the input filter circuit 18. The differential amplifier circuit 20 scales the filtered voltage signal which is then transmitted from an output of the amplifier 20 to an input of a voltage adjustment means 22. The voltage adjustment means 22 scales the amplified voltage signal and transmits the signal to a voltage to frequency converter circuit 24, shown for example only and not meant to be limiting as a AD654/SO circuit made by Analog Devices. The scaled signal is converted from an analog voltage signal to a frequency signal in the converter circuit 24 and transmitted to at least one of the two transmission channels 28 and 30, channel 1 and channel 2 respectively, of the transmitter 12 as shown in FIG. 3. Both channels 28 and 30 are coupled to a fiber optic cable 16.

Figure 4B:
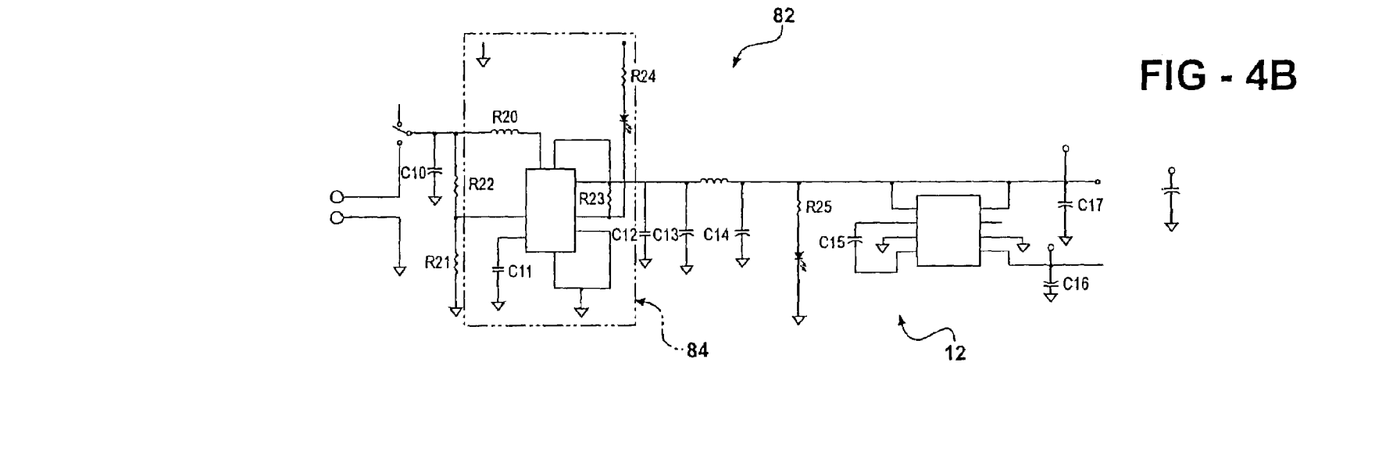
FIG. 4B is a circuit diagram of a power supply of the transmitter apparatus shown in FIG. 4A.

The transmitter apparatus 12 includes a power supply circuit 82 shown in FIG. 4B, the power supply circuit 82 is a low power consumption circuit. The low power consumption feature allows the transmitter 12 to operate for an extended period of time. The power supply circuit 82 is driven by three 'AA' batteries connected in series. The connection produces 4.5V of power that is stepped-up by a step-up circuit 84 to 5V to operate the transmitter 12 at a 94-95% efficiency rating.

Figure 6:
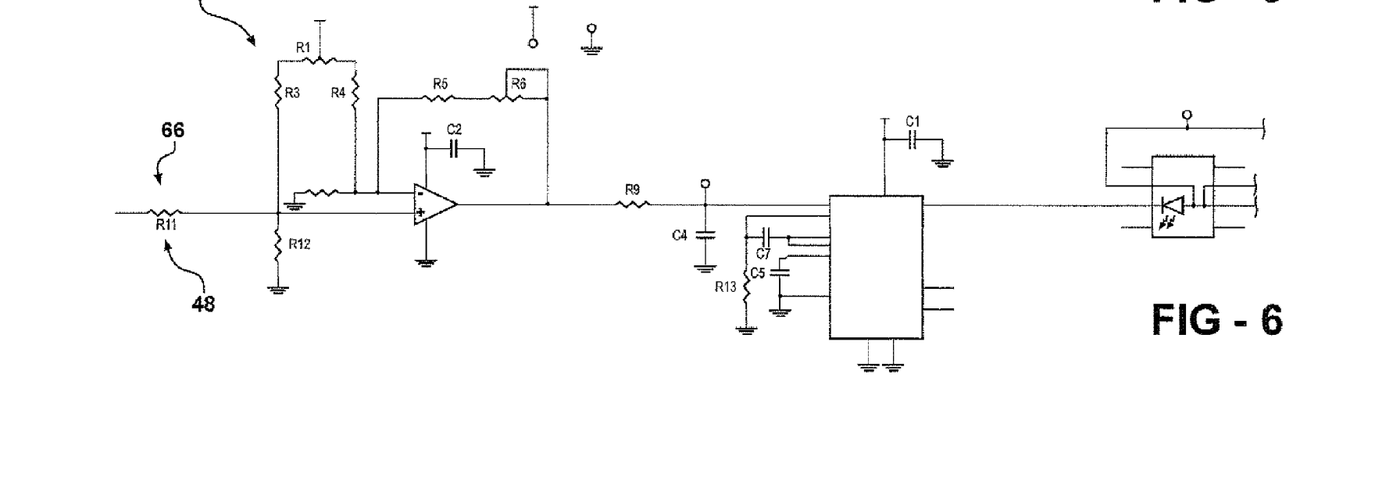
FIG. 6 is a circuit diagram of a measurement means of the transmitter apparatus.
Figure 12:
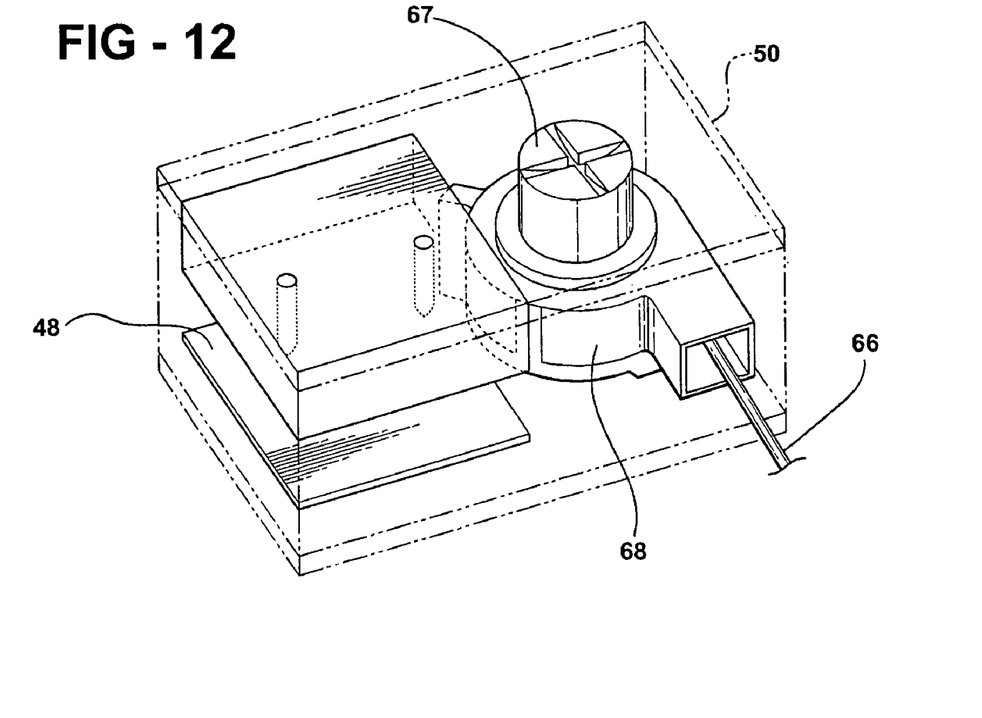
FIG. 12 is a perspective view of a displacement apparatus of the transmitter apparatus.

In one aspect, the transmitter apparatus 12 can detect and modulate an analog voltage input signal that is transmitted from a measurement means 50 used to measure displacement, as shown in FIGS. 2 and 12. The circuit diagram of the measurement means 50 is shown in FIG. 6. An output channel of the measurement means 50 is coupled to an input of the transmission apparatus 12. The measurement means 50 includes a voltage divider circuit 48 as shown in FIG. 6. The measurement means also includes a flexible cable 66 that actuates a potentiometer 67. The cable 66 is formed of Kevlar or another suitable material and, is biasingly extendable and retractable on a rotatable reel 68 for up to a distance of 32 inches total or plus and minus 16 inches, for example only. The extension or retraction of the cable 66 actuates the potentiometer 67 correlating to a voltage measurement, which changes resistance to generate a signal. For example, each inch of extension correlates to 1V.

Figure 7:
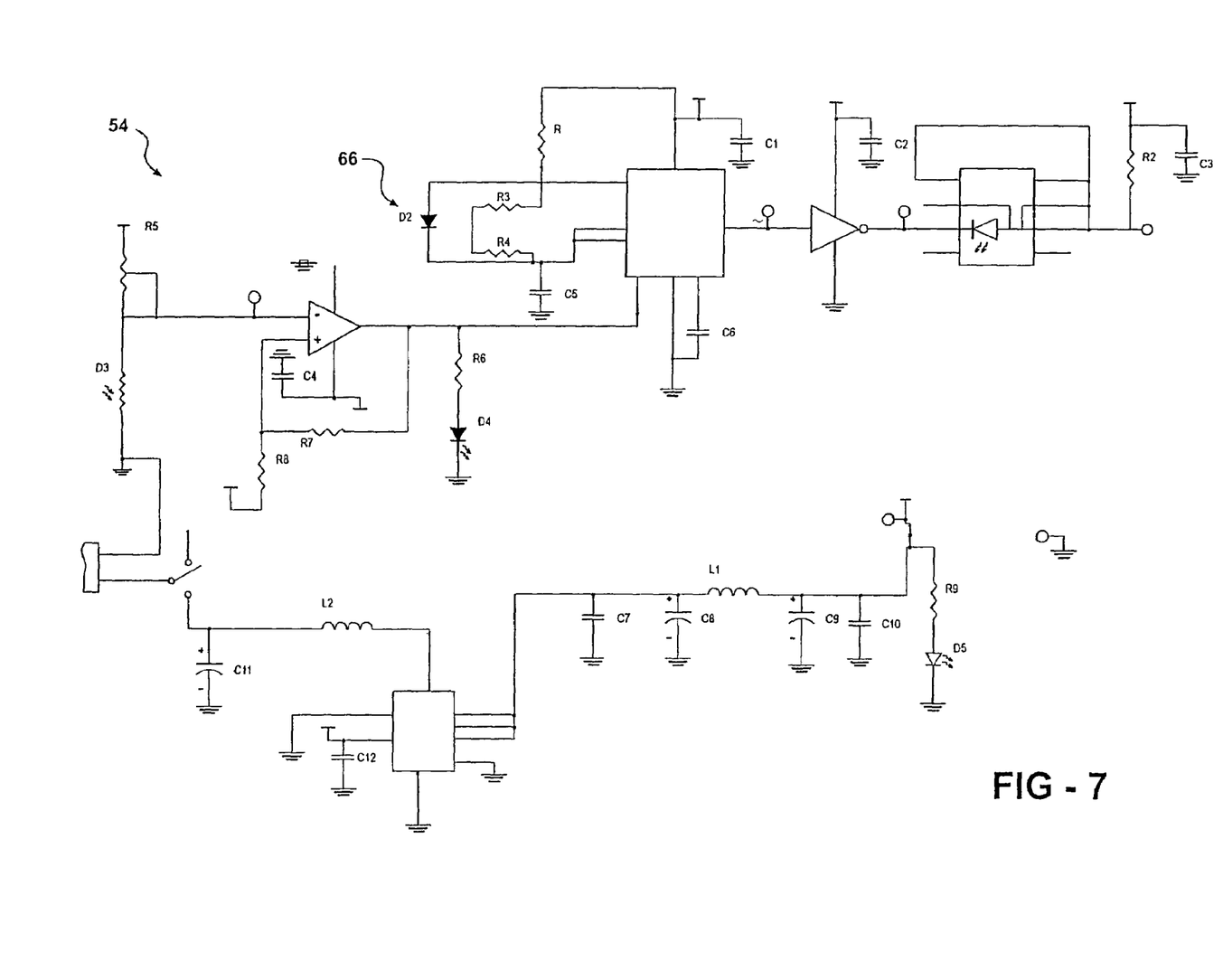
FIG. 7 is a perspective view of a circuit diagram of a light detector of the transmitter apparatus.

In another aspect, the transmitter apparatus 12 receives an analog voltage input signal that is transmitted from a light detector means 54 used for detecting the non-existence and the existence of light, as shown in FIG. 2. The circuit diagram of the light detector means 54 is shown in FIG. 7. An output channel of the light detector means 54 is coupled to an input of the transmission apparatus 12. The light detector means 54 includes a photo detector 80 that detects light. The light detector means 54 also includes sensitivity adjustment means 56. The adjustment means 56 is adjusted to capture a varying or flashing light source. Once light is capture by the adjustment means 56, the captured light is converted into a measurable analog signal and applied to an electrical conductor 65. A threshold of the detector 54 is set by adjusting a potentiometer as required to cause a light emitting diode to flash in accordance with the flashing sequence of the light source. This feature allows adjustment for ambient light conditions.

The light detector means 54 can also be devised to detect infra-red light. The light detector means 54 including a photo detector 80 is stationed in a closed test chamber wherein the transmitter 12 receives the infra-red light signal from a source inside the chamber. The transmitter 12 applies the detected infra-red light signal to electrical conductive means 64 coupled to an output of the transmitter 12 and, the infra-red signal is sent to the receiver 14 outside the chamber. The receiver 14 converts the signal to a voltage signal within the range of 0-5V. The converted voltage measurement value corresponds to the device under test.

Figure 10:
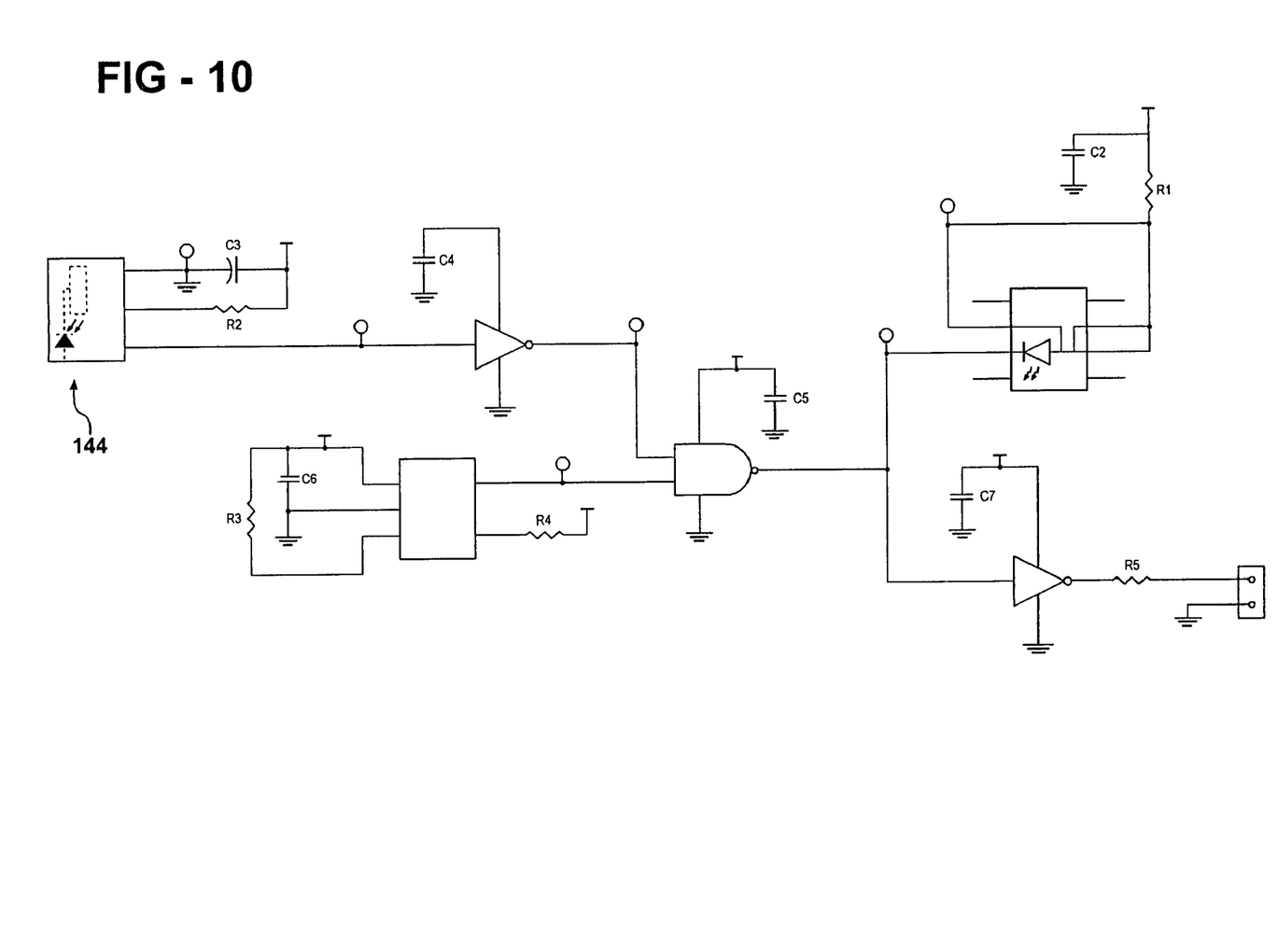
FIG. 10 is a circuit diagram of an IR Repeater transmitter apparatus.
Figure 11:
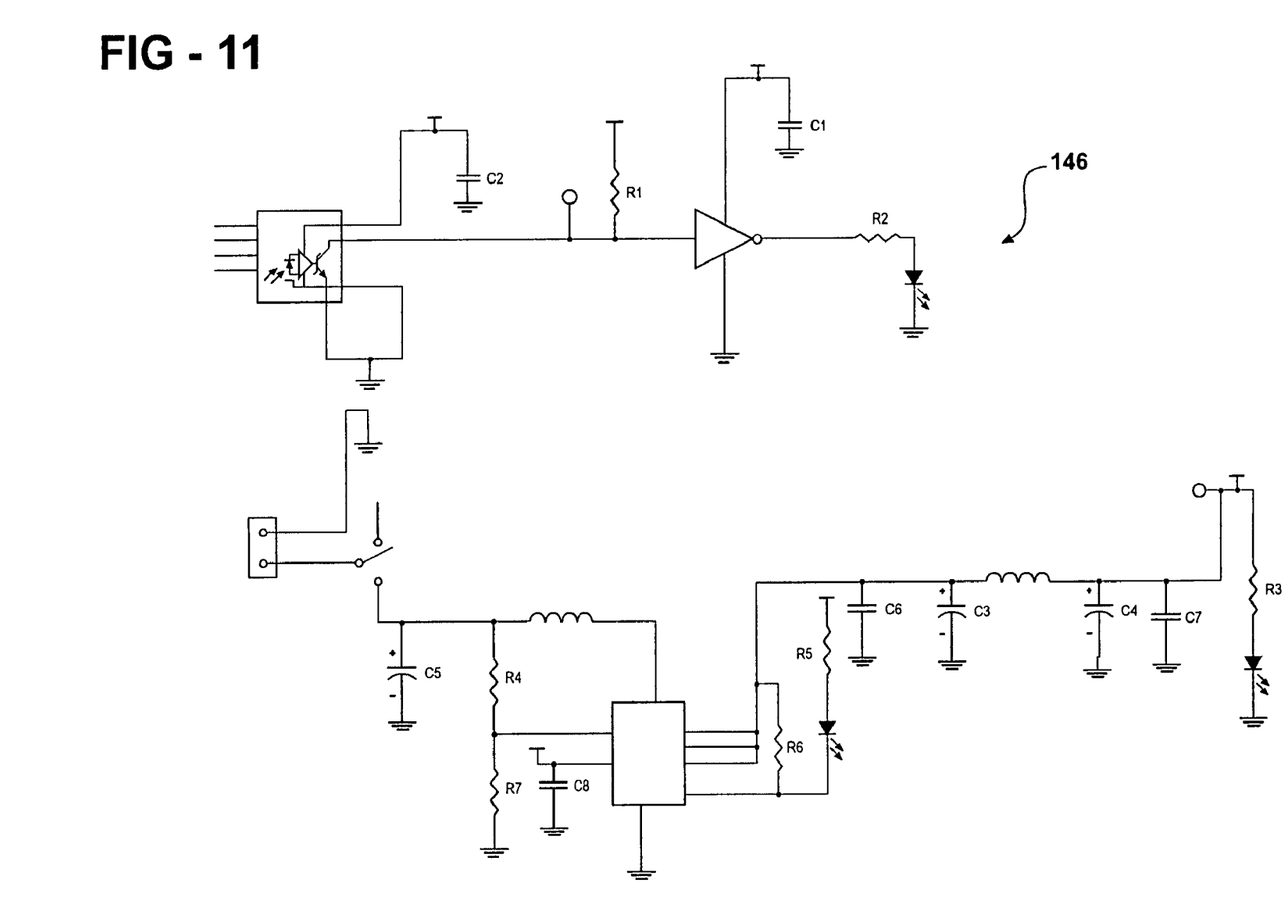
FIG. 11 is a circuit diagram of an IR Repeater receiver apparatus.
Figure 13:
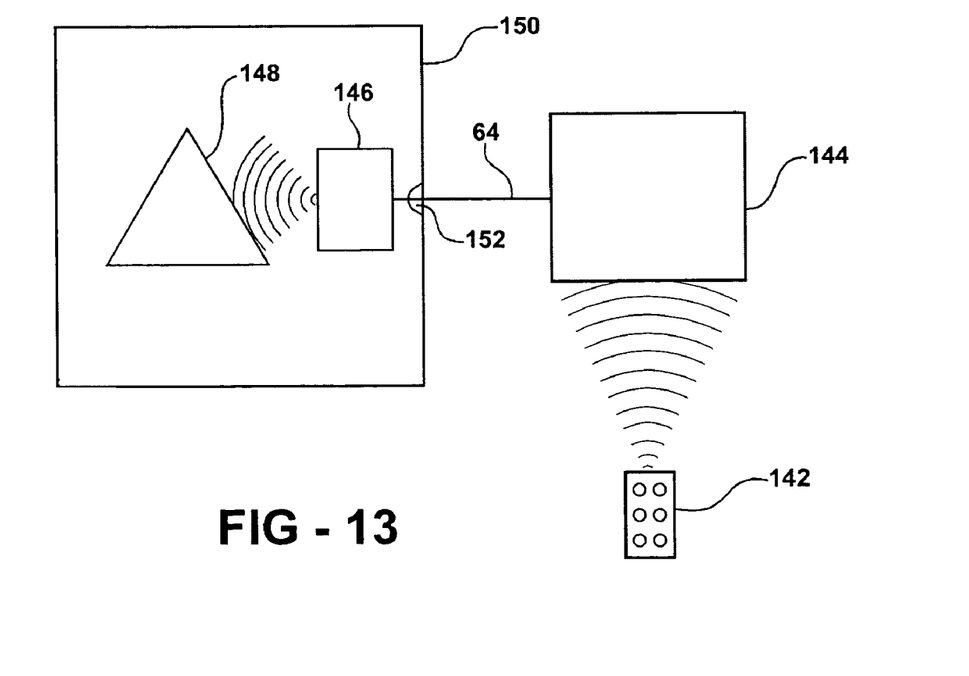
FIG. 13 is a block diagram of the fiber optic communication link apparatus where the apparatus is remote controlled.

An optional feature of the fiber optic communication signal link apparatus 10 is remote control operation of the apparatus 10. As shown in FIG. 13, the remote control option is used when a device 148 under test is located in a high elecromagnetic field area such as a chamber 150. An operator aims a remote 142 at an IR repeater transmitter 144 and selects the desired operation on the remote 142 by pressing an appropriate button on the remote 142. Subsequently, an infra-red signal representing the chosen operation is sent to the transmitter 144 which is located outside of the chamber 150. Once the infra-red signal reaches the transmitter 144, the infra-red signal is converted to a fiber optic signal and applied to the electrical conductor 64 coupled to the transmitter 144. The electrical conductor 64 extends through a bore 152 in a wall of the chamber 150 to an end where the conductor is coupled to an IR repeater receiver 146. The circuit of the IR repeater transmitter 144 is shown in FIG. 10. The circuit includes an integrated chip, TSOP2238, by example only, made by Vishay. The circuit of the IR repeater receiver 146 is shown in FIG. 11. The circuit includes an integrated chip, Max 1675, by example only, made by Maxim.

Figure 9:
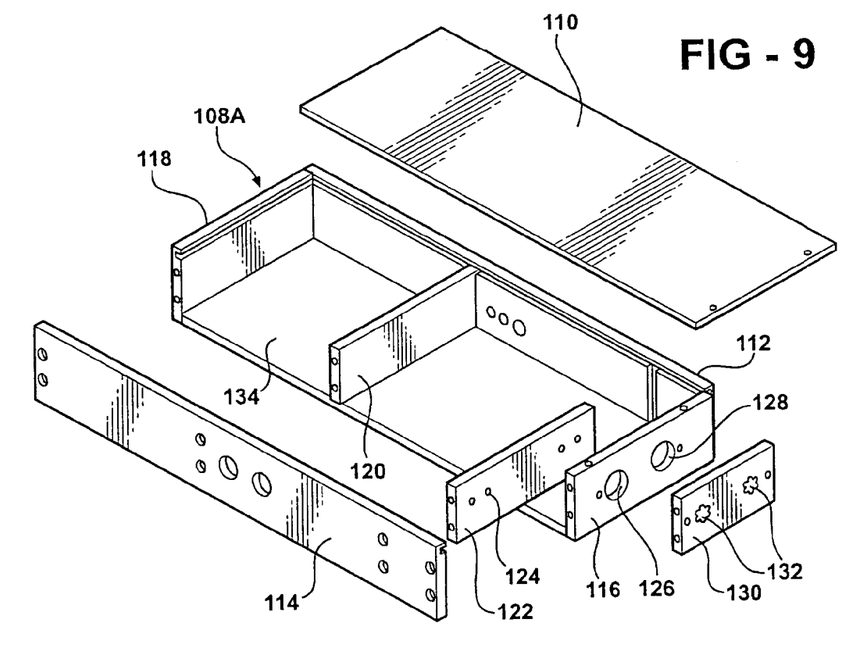
FIG. 9 is an exploded perspective view of a housing of a fiber optic transmitter used for transmitting audio measurement signals.

In another aspect, the transmitter apparatus 12 modulates an analog voltage input signal that is received from an audio means 58 used to measure sound as shown in FIG. 2. The audio means 58 is coupled to an input of the transmitter apparatus 12. The housing 108A of the transmitter 12 that receives the analog input signal from the audio means 58 varies from the standard housing 108 of the transmitter. This housing 108 includes a microphone cover 130, as shown in FIG. 9, for covering a microphone.

The audio means 58 includes two channels 60 and 62, channel 1 and channel 2, respectively, for receiving a variety of audio signals including a unidirectional, an omnidirectional and a low noise microphone signal. The audio transmitter 12 circuit is similar to the analog transmitter 12 circuit with the exception of an added microphone 140, as shown in FIG. 4A. The audio transmitter 12 circuit also includes biasing means and coupling means being added at the front end of the transmitter 12 circuit.

An optional feature of the fiber optic communication signal link apparatus 10 includes usage of a wave guide 55, as shown in phantom in FIG. 8. The input leads 126 and 128 of the transmitter 12 are coupled to wave guides 55 and 55A. The wave guides 55 and 55A are hollow, tube-shaped apparatuses usually constructed of metal and used for conducting RF energy from a point source. The wave guides 55 and 55A may also be used as a filter by allowing light or audio to enter into or out of a particular space. At the same time, the wave guides 55 and 55A shield any unfocused RF energy from entering or leaving the space.

Figure 5:
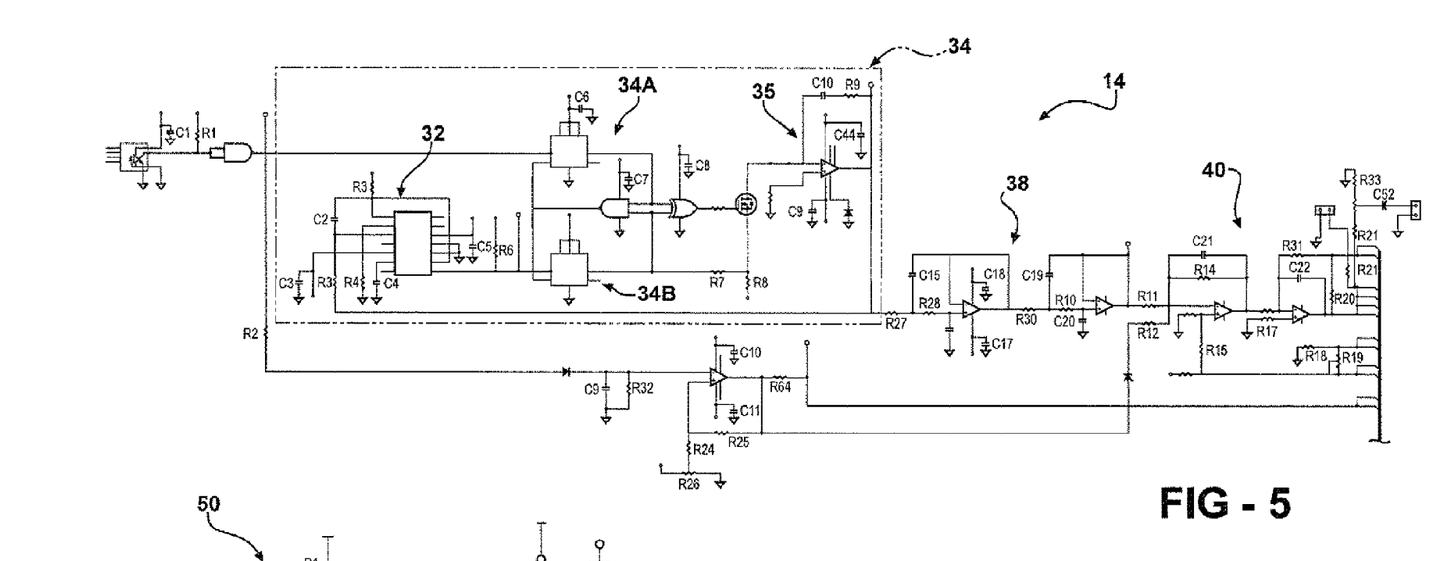
FIG. 5 is a circuit diagram of the receiver apparatus of FIG. 3.

As shown in FIG. 5, the converted frequency signal transmitted by the fiber optic apparatus 12 travels through fiber optic cable 16 to at least one input channel 42 and 44 of a receiver apparatus 14 wherein the path of the frequency signal is directed to a phase locked-loop circuit 34. The phase locked-loop circuitry 34 is made up of frequency comparators 34A and 34B, an integrator 35, and a voltage to frequency converter (oscillator) 32 along with associated logic and MOS-FET switch. The phase locked-loop 34 provides a precise linear relationship between the input frequency and the desired output voltage. This oscillator 32 is forced to a frequency and phase equal to an input reference signal wherein this frequency output is the desired output signal and not the voltage. At this stage a low-pass filter 38 is used to recover the desired analog output signal from the integrator voltage applied to the oscillator 32. Subsequently, the voltage signal is transmitted from an output of the low pass filter 38 to an input of a voltage scale means 40 coupled to the filter 38. The voltage scale means 40 is used for adjusting the value range of the voltage signal up and down.

A fiber optic communication system that eliminates the various distortions in amplitude modulation fiber optic transmission systems has been disclosed. The system provides the ability to transmit electrical signals over fiber optic cables from sources in high electromagnetic fields to monitoring equipment in low field areas. The system also reduces electromechanical interference on the transmitted signal without compromising signal integrity.

What is claimed is:

1. A fiber optic communication signal link apparatus for communication of data comprising:
    a transmitter apparatus including:
    an input filter for noise reduction of a received analog voltage input;
    differential amplifying means, coupled to the input filter, for amplifying the analog voltage input;
    voltage adjustment means, coupled to the differential amplifying means, for scaling a voltage of the analog voltage input; and
    a voltage to frequency converter, coupled to the voltage adjustment means, for converting the analog voltage input to a frequency output.

2. The fiber optic communication signal link apparatus of claim 1 wherein the transmitter apparatus further comprises a plurality of transmission channels coupled to an input end of a fiber optic cable.

3. The transmitter apparatus of claim 2 wherein the plurality of transmission channels includes two channels.

4. The fiber optic communication signal link apparatus of claim 1 wherein measurement means for measuring displacement, is coupled to the transmitter apparatus, the transmitter apparatus receiving and modulating the measured signal.

5. The fiber optic communication signal link apparatus of claim 4 wherein the measurement means further comprises a voltage divider.

6. The fiber optic communication signal link apparatus of claim 5 wherein the measurement means further comprises:
    a flexible cable biasingly extendable and retractable for measuring displacement, the cable coupled to a potentiometer for converting the measured extendable and retractable cable length to a corresponding electrical signal.

7. The fiber optic communication signal link apparatus of claim 1 wherein a light detector means for measuring light, is coupled to the transmitter apparatus, the transmitter apparatus detects and modulates the measured light signal.

8. The fiber optic communication signal link apparatus of claim 7 wherein the light detector means comprises sensitivity adjuster means for adjusting the light detector for a plurality of ambient light conditions.

9. The fiber optic communication signal link apparatus of claim 8 wherein the light detector means further comprises a waveguide for preventing electro-magnetic interference.

10. The fiber optic communication signal link apparatus of claim 9 wherein the light detector means further comprises a photo-sensor for detecting one of visible light and infra-red light signals.

11. The fiber optic communication signal link apparatus of claim 1 further comprising audio means for detecting sound coupled to the transmitter, the transmitter detecting an analog signal, converting the analog signal to a frequency signal and modulating the frequency signal.

12. The fiber optic communication signal link apparatus of claim 11 wherein the audio means includes two independent channels for receiving at least one of a unidirectional, an omnidirectional and low noise signal.

13. The fiber optic communication signal link apparatus of claim 12 wherein the audio means further comprises a waveguide for preventing electro-magnetic interference.

14. The fiber optic communication signal link apparatus of claim 1 wherein the transmitter further comprises a low power consumption power supply.

15. A fiber optic communication signal link apparatus for communication of data comprising:
a receiver apparatus including:
a frequency comparator;
an integrator;
a phase locked loop circuit, coupled to the frequency comparator;
a frequency to voltage converter, coupled to the phase locked loop circuit, for converting the received frequency signal to a voltage output;
a low pass filter, coupled to the frequency to voltage converter, for noise reduction of the voltage output; and
voltage adjustment means, coupled to the low pass filter, for scaling the voltage of the output.

16. The fiber optic communication signal link apparatus of claim 15 wherein the receiver apparatus further comprises a plurality of input channels.

17. The fiber optic communication signal link apparatus of claim 16 wherein the plurality of input channels is at least one of two, four and twelve channels.

18. A fiber optic communication signal link apparatus for communication of data including at least one of displacement, light and audio data comprising:
(a) a fiber optic transmission means for transmitting an analog voltage input signal, said transmission means comprising:
an input filter for noise reduction of a received analog voltage input;
gain selector means, coupled to the input filter, for amplifying the analog voltage input;
voltage adjustment means, coupled to the gain selector means, for scaling a voltage of the analog voltage input; and
a voltage to frequency converter, coupled to the voltage adjustment means, for converting the analog voltage input to a frequency output; and
(b) a fiber optic receiver means for receiving a transmitted signal, said receiver means comprising:
a phase locked loop circuit;
a low pass filter, coupled to the phased locked loop circuit, for noise reduction of the voltage output; and
voltage adjustment means, coupled to the low pass filter, for scaling the voltage of the output.

19. The fiber optic communication signal link apparatus of claim 18 wherein a fiber optic cable couples said transmission means and said receiver means together.

20. The fiber optic communication signal link apparatus of claim 19 wherein at least one of an output channel of said transmission means is coupled to an input end of the fiber optic cable.

21. The fiber optic communication signal link apparatus of claim 19 wherein at least one of an input channel of said receiver means is coupled to an output end of the fiber optic cable.

22. The fiber optic communication signal link apparatus of claim 19 wherein the transmission means and the receiver a means are remotely controlled.

23. The fiber optic communication signal link apparatus of claim 18 wherein the transmission means further comprises a plurality of transmission channels coupled to an input end of a fiber optic cable.

24. The transmission means of claim 23 wherein the plurality of transmission channels includes two channels.

25. The fiber optic communication signal link apparatus of claim 18 further comprising measurement means for measuring displacement coupled to the transmission means, the transmission means receiving and modulating a measured signal.

26. The fiber optic communication signal link apparatus of claim 25 wherein the measurement means further comprises a voltage divider.

27. The fiber optic communication signal link apparatus of claim 26 wherein the measurement means further comprises:
a flexible cable biasingly extendable and retractable for measuring displacement, the cable coupled to a potentiometer for converting the measured extendable and retractable cable length to a corresponding electrical signal.

28. The fiber optic communication signal link apparatus of claim 18 wherein a light detector means for measuring light is coupled to the transmission means, the transmission means detecting and modulating a measured light signal.

29. The fiber optic communication signal link apparatus of claim 28 wherein the light detector means comprises sensitivity adjuster means for adjusting the light detector means for a plurality of ambient light conditions.

30. The fiber optic communication signal link apparatus of claim 29 wherein the light detector means further comprises a waveguide for preventing electro-magnetic interference.

31. The fiber optic communication signal link apparatus of claim 30 wherein The light detector means further comprises a photo-sensor for detecting one of visible light and infra-red light signals.

32. The fiber optic communication signal link apparatus of claim 18 further comprising audio means for detecting sound coupled to the transmitter, the transmitter detecting an analog signal, converting the analog signal to a frequency signal and modulating The frequency signal.

33. The fiber optic communication signal link apparatus of claim 32 wherein the audio means includes two independent channels for receiving at least one of a unidirectional, an omnidirectional and low noise signal.

34. The fiber optic communication signal link apparatus of claim 33 wherein the audio means further comprises a waveguide for preventing electro-magnetic interference.

35. The fiber optic communication signal link apparatus of claim 18 wherein the transmission means further comprises a low power consumption power supply.

36. The fiber optic communication signal link apparatus of claim 18 wherein the receiver means further comprises a plurality of input channels.

37. The fiber optic communication signal link apparatus of claim 36 wherein the plurality of input channels is at least one of two, four and twelve channels.

38. The fiber optic communication signal link apparatus of claim 18 wherein the phase locked loop circuit comprises:
a frequency to voltage and voltage to frequency converter;
at least one frequency comparator coupled to the frequency to voltage and voltage to frequency converter; and
an integrator coupled to the at least one frequency comparator and the frequency to voltage and voltage to frequency converter.

* * * * *